US008930820B1

(12) United States Patent
Elwell et al.

(10) Patent No.: US 8,930,820 B1
(45) Date of Patent: Jan. 6, 2015

(54) AUTOMATIC CALENDARING SYSTEM

(75) Inventors: Joseph Elwell, San Diego, CA (US); Alan F. Buhler, Escondido, CA (US); Marianne Y. Lu, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 359 days.

(21) Appl. No.: 13/174,595

(22) Filed: Jun. 30, 2011

(51) Int. Cl.
G06F 3/00 (2006.01)
G06F 15/02 (2006.01)
G06F 17/00 (2006.01)
G06Q 10/10 (2012.01)
G06F 3/048 (2013.01)
G06Q 10/06 (2012.01)
G06Q 50/00 (2012.01)
H04L 12/58 (2006.01)
G06F 13/10 (2006.01)
G06F 9/48 (2006.01)
H04N 19/102 (2014.01)
H04N 19/503 (2014.01)
H04L 29/08 (2006.01)
G09D 3/12 (2006.01)
G06F 9/50 (2006.01)

(52) U.S. Cl.
CPC ........... *G06F 15/0266* (2013.01); *G06F 17/60* (2013.01); *G06Q 10/109* (2013.01); *G06F 3/048* (2013.01); *G06Q 10/1093* (2013.01); *G06Q 10/06* (2013.01); *G06Q 50/01* (2013.01); *H04L 12/588* (2013.01); *G06F 13/102* (2013.01); *G06Q 10/10* (2013.01); *G06F 9/4881* (2013.01); *H04N 7/26015* (2013.01); *H04N 7/36* (2013.01); *H04L 67/306* (2013.01); *G09D 3/12* (2013.01); *G06F 9/5038* (2013.01); *Y10S 715/963* (2013.01)

USPC .......... 715/738; 715/231; 715/963; 708/112; 705/319

(58) Field of Classification Search
CPC ..... G09D 3/12; G06F 15/0266; G06F 9/4881; G06F 9/5038; G06F 13/102; G06F 17/60; G06Q 50/01; G06Q 10/06314; G06Q 10/10; G06Q 10/109; G06Q 10/1093; G06Q 10/06; H04L 12/588; H04L 67/306; H04N 7/26015; H04N 7/36
USPC ............ 715/738, 963, 231; 708/112; 705/319
See application file for complete search history.

(56) References Cited

U.S. PATENT DOCUMENTS

| 5,692,125 A * | 11/1997 | Schloss et al. ............... 705/7.16 |
| 5,813,013 A * | 9/1998 | Shakib et al. ........................ 1/1 |
| 5,918,216 A * | 6/1999 | Miksovsky et al. ............. 705/35 |
| 6,108,640 A * | 8/2000 | Slotznick ..................... 705/7.18 |
| 6,272,074 B1 * | 8/2001 | Winner .......................... 368/10 |

(Continued)

*Primary Examiner* — Patrick Riegler
*Assistant Examiner* — Jennifer Nichols
(74) *Attorney, Agent, or Firm* — Osha Liang LLP

(57) ABSTRACT

In general, in one aspect, the invention relates to a method for maintaining a calendar of a user. The method includes: accessing an online profile of the user corresponding to a first social networking website; identifying, on the first social networking website, a first entry referencing a physical location, where the first entry is entered on a first calendar date; identifying, on the first social networking website, a second entry referencing the physical location, where the second entry is entered on a second calendar date; calculating, based on the first calendar date and the second calendar date, a first frequency of user visits to the physical location; estimating, based on the first frequency, a future calendar date when the user is expected to visit the physical location; and creating, in the calendar, a future event scheduled to occur at the physical location.

19 Claims, 5 Drawing Sheets

(56) References Cited

U.S. PATENT DOCUMENTS

| | | | |
|---|---|---|---|
| 6,360,217 B1* | 3/2002 | Gopal et al. | 1/1 |
| 6,446,004 B1* | 9/2002 | Cao et al. | 701/482 |
| 6,457,062 B1* | 9/2002 | Pivowar et al. | 709/248 |
| 6,603,489 B1* | 8/2003 | Edlund et al. | 715/780 |
| 6,604,059 B2* | 8/2003 | Strubbe et al. | 702/178 |
| 6,675,356 B1* | 1/2004 | Adler et al. | 715/200 |
| 6,680,675 B1* | 1/2004 | Suzuki | 340/988 |
| 6,845,370 B2* | 1/2005 | Burkey et al. | 707/749 |
| 7,009,643 B2* | 3/2006 | Nakamura et al. | 348/231.4 |
| 7,149,810 B1* | 12/2006 | Miller et al. | 709/246 |
| 7,325,198 B2* | 1/2008 | Adcock et al. | 715/722 |
| 7,363,243 B2* | 4/2008 | Arnett et al. | 705/7.31 |
| 7,441,194 B2* | 10/2008 | Vronay et al. | 715/738 |
| 7,499,715 B2* | 3/2009 | Carro et al. | 455/456.3 |
| 7,757,181 B2* | 7/2010 | Pan et al. | 715/772 |
| 7,970,793 B2* | 6/2011 | Davia et al. | 707/793 |
| 8,126,922 B2* | 2/2012 | Holzapfel et al. | 707/785 |
| 8,229,458 B2* | 7/2012 | Busch | 455/456.1 |
| 8,250,651 B2* | 8/2012 | Huang et al. | 726/22 |
| 8,290,513 B2* | 10/2012 | Forstall et al. | 455/456.3 |
| 8,290,999 B2* | 10/2012 | Shepherd et al. | 707/728 |
| 8,321,527 B2* | 11/2012 | Martin et al. | 709/217 |
| 8,448,204 B2* | 5/2013 | Johnson et al. | 725/13 |
| 2002/0078070 A1* | 6/2002 | Eshelman et al. | 707/200 |
| 2003/0154116 A1* | 8/2003 | Lofton | 705/8 |
| 2005/0192857 A1* | 9/2005 | Levine | 705/8 |
| 2007/0015521 A1* | 1/2007 | Casey | 455/456.3 |
| 2007/0214180 A1* | 9/2007 | Crawford | 707/104.1 |
| 2009/0012760 A1* | 1/2009 | Schunemann | 703/6 |
| 2009/0040875 A1* | 2/2009 | Buzescu et al. | 368/29 |
| 2009/0235280 A1* | 9/2009 | Tannier et al. | 719/318 |
| 2009/0276504 A1* | 11/2009 | Gavranovic | 709/218 |
| 2010/0076968 A1* | 3/2010 | Boyns et al. | 707/732 |
| 2010/0162105 A1* | 6/2010 | Beebe et al. | 715/273 |
| 2010/0169146 A1* | 7/2010 | Hoyne et al. | 705/9 |
| 2010/0293029 A1* | 11/2010 | Olliphant | 705/9 |
| 2011/0047479 A1* | 2/2011 | Ghosh | 715/747 |
| 2011/0072035 A1* | 3/2011 | Gaucas et al. | 707/769 |
| 2011/0072354 A1* | 3/2011 | Kazan et al. | 715/738 |
| 2011/0202474 A1* | 8/2011 | Mele et al. | 705/36 R |
| 2011/0213670 A1* | 9/2011 | Strutton et al. | 705/14.73 |
| 2011/0252351 A1* | 10/2011 | Sikora et al. | 715/769 |
| 2011/0295612 A1* | 12/2011 | Donneau-Golencer et al. | 705/1.1 |
| 2012/0030282 A1* | 2/2012 | Brody et al. | 709/203 |
| 2012/0051644 A1* | 3/2012 | Das et al. | 382/190 |
| 2012/0076367 A1* | 3/2012 | Tseng | 382/118 |
| 2012/0102114 A1* | 4/2012 | Dunn et al. | 709/204 |
| 2012/0124458 A1* | 5/2012 | Cruzada | 715/205 |
| 2012/0226779 A1* | 9/2012 | Crucs | 709/219 |
| 2012/0227086 A1* | 9/2012 | Dale et al. | 726/3 |
| 2012/0272160 A1* | 10/2012 | Spivack et al. | 715/752 |
| 2012/0284340 A1* | 11/2012 | Young | 709/204 |
| 2013/0007648 A1* | 1/2013 | Gamon et al. | 715/771 |
| 2013/0205225 A1* | 8/2013 | Deng et al. | 715/751 |

* cited by examiner

AUTOMATIC CALENDARING SYSTEM

BACKGROUND

As the popularity and capabilities of smartphones, netbooks, personal digital assistants (PDAs), tablet computers, and other mobile devices have grown, social networking services have utilized such devices to facilitate real-time interaction between users. Over time, these devices have contributed to behavioral and cultural shifts among an entire generation of social networking users. Users are now able to share unprecedented amounts of personal and professional data among colleagues, friends, coworkers, and businesses of their choosing.

Meanwhile, increased bandwidth and data transmission speeds have opened the door to seamless integration between applications installed on a variety of physical devices of a user. Many such devices have global positioning system (GPS) receivers which provide users with location-based information. For example, a user of a smartphone may obtain driving directions based on a current location. In addition to receiving location-based information, users may choose to share location-based information with one or more social networking services.

This influx of user data has lead to a wide range of applications. Beneficial applications of this data have been developed, including customized search, content, and support. Software applications can now increase the relevance of content and tailor information based on historical analysis, usage statistics, and various other metrics derived from user data. Conversely, malicious software has been created to mine data from users' now integrated online presence.

Many users periodically update one or more social networking services with a status, location, mood, and/or message. These updates may be shared with other users and/or entities of a social networking service according to one or more security protocols defined by the service. As a result, individuals, companies, and entities of all types have unprecedented access to a continuously growing wealth of information within a respective social network.

SUMMARY

In general, in one aspect, the invention relates to a method for maintaining a calendar of a user. The method includes: accessing an online profile of the user corresponding to a first social networking website; identifying, on the first social networking website, a first entry referencing a physical location, where the first entry is entered by the user on a first calendar date; identifying, on the first social networking website, a second entry referencing the physical location, where the second entry is entered by the user on a second calendar date; calculating, by a computer processor and based on the first calendar date and the second calendar date, a first frequency of user visits to the physical location; estimating, based on the first frequency, a future calendar date when the user is expected to visit the physical location; and creating, in the calendar, an event scheduled to occur at the physical location and corresponding to the future calendar date.

In general, in one aspect, the invention relates to a non-transitory computer-readable storage medium storing instructions for maintaining a calendar of a user. The instructions include functionality to: access an online profile of the user corresponding to a first social networking website; identify, on the first social networking website, a first entry referencing a physical location, where the first entry is entered by the user on a first calendar date; identify, on the first social networking website, a second entry referencing the physical location, where the second entry is entered by the user on a second calendar date; calculate, based on the first calendar date and the second calendar date, a first frequency of user visits to the physical location; estimate, based on the first frequency, a future calendar date when the user is expected to visit the physical location; and create, in the calendar, an event scheduled to occur at the physical location and corresponding to the future calendar date.

In general, in one aspect, the invention relates to a system for maintaining a calendar of a user. The system includes: a processor; a calendar server executing on the processor and configured to: access an online profile of the user corresponding to a first social networking website; identify, on the first social networking website, a first entry referencing a physical location, where the first entry is entered by the user on a first calendar date; identify, on the first social networking website, a second entry referencing the physical location, where the second entry is entered by the user on a second calendar date; calculate, based on the first calendar date and the second calendar date, a first frequency of user visits to the physical location; estimate, based on the first frequency, a future calendar date when the user is expected to visit the physical location; and create, in the calendar, an event scheduled to occur at the physical location and corresponding to the future calendar date.

Other aspects of the invention will be apparent from the following description and the appended claims.

DETAILED DESCRIPTION

Figure 1:
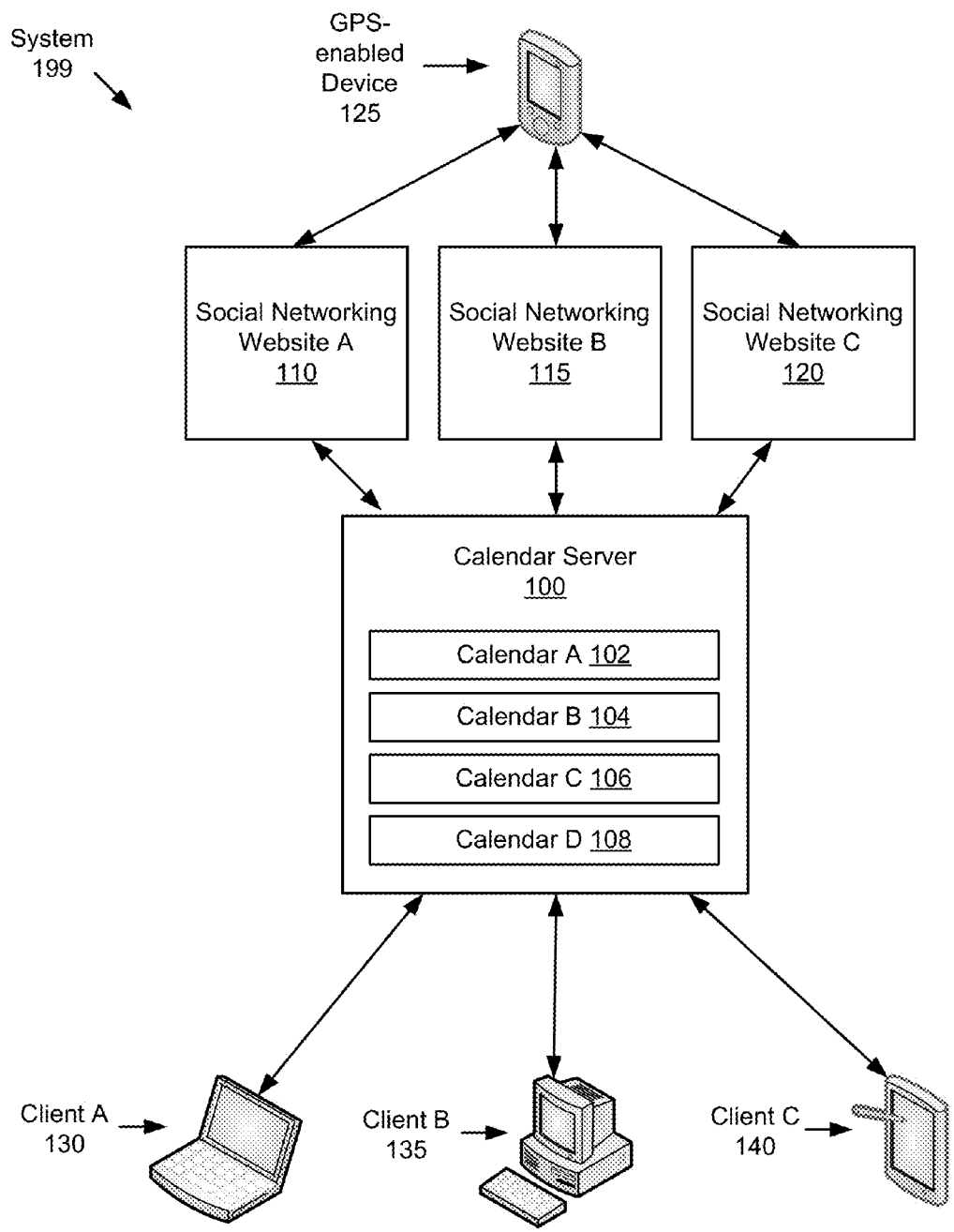
FIG. 1 shows a schematic diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for maintaining a calendar of a user. In general, embodiments of the invention identify, on a social networking website, one or more entries made by a user and referencing a location. A frequency of visits to the location may then be identified. Based on the frequency, a new event may be added to the calendar.

FIG. 1 shows a system (199) in accordance with one embodiment of the invention. As shown in FIG. 1, the system has multiple components including a calendar server (100), a set of calendars (i.e., calendar A (102), calendar B (104), calendar C (106), calendar D (108)), a social networking website A (110), a social networking website B (115), a social networking website C (120), a GPS-enabled device (125), a client A (130), a client B (135), and a client C (140). The components of the system may be located on the same device (e.g., a server, mainframe, desktop Personal Computer (PC), laptop, Personal Digital Assistant (PDA), telephone, mobile phone, kiosk, cable box, and any other device) or may be located on separate devices connected by a network (e.g. the Internet), with wired and/or wireless segments. Those skilled in the art will appreciate that there may be more than one of each separate component running on a device, as well as any combination of these components within a given embodiment of the invention.

In one or more embodiments of the invention, the calendar server (100) is a software application or a set of software applications executing on one or more hardware processors. The software application may be a web application in a server of a data center and/or a cloud computing application in a network distributed system. Alternatively, the calendar server (100) may be a software application residing in a personal computing device (e.g., smartphone, laptop computer, desktop computer, etc.) of a user. In one or more embodiments of the invention, the calendar server (100) is integrated within or operatively connected to an email application, a personal information manager, a financial management application (FMA), or other type of application.

In one or more embodiments of the invention, the calendar server (100) includes functionality to create and maintain one or more calendars for a user. The calendar server (100) may be configured to maintain calendar information for the calendar. Calendar information may include one or more events, notifications, address books, dates (i.e., calendar dates), appointments, messages (e.g., email messages, text messages, instant messages, etc.), comments, holidays, reminders, alarms and/or related information in the calendar. The calendar may be a calendar (i.e., calendar A (102), calendar B (104), calendar C (106), calendar D (108)) within the calendar server (100) or an external calendar within a personal information manager (PIM) application, a web-based calendar application, a calendar of a social networking website, a mobile calendar application and/or any type of calendar in accordance with various embodiments of the invention.

In one or more embodiments of the invention, the calendar server (100) includes a user interface. The user interface may include functionality to receive input from a user and to create and/or modify calendar information (e.g., events, calendar dates, appointments, etc.). The calendar server (100) may receive input from the GPS-enabled device (125), a client application (e.g., a client A (130), a client B (135), and a client C (140)), a web browser, and/or any other means of accepting input from a user. In one or more embodiments of the invention, the calendar server (100) is configured to obtain the security credentials from the user via the user interface. Security credentials may include a username, password, user ID, identifying information (e.g., social security number, account number(s), date of birth, identification card number, etc.), and/or any information which may be used to obtain access to a website and/or software application. The calendar server (100) may also use the security credentials to verify the identity of the user.

In one or more embodiments of the invention, the calendar server (100) includes functionality to obtain data from a social networking website (e.g., social networking website A (110), social networking website B (115), social networking website C (120)). The calendar server (100) may extract data by scraping the social networking website using one or more security credentials of a user. Alternatively, the calendar server (100) may establish a secure communication session with a server application associated with the social networking website and may obtain data (e.g., calendar information) from the server application using the secure communication session. Examples of data obtained from the social networking website may include one or more images (e.g., in JPEG, PNG, GIF, BMP, and/or other formats), global positioning system (GPS) coordinates, entries, messages, checkins, status updates, events, calendar dates, and/or alerts related to the user.

An entry to a social networking website may include any type of temporal data or related data uploaded or inputted into the website. Examples of an entry may include, but are not limited to, an image containing a timestamp within metadata of the image, a checkin, a post, message, status update, comment, file upload, multimedia file, and/or any change, modification, and/or input to the website that contains a date (i.e., calendar date) and/or time. The entry may be created, by the user, using a client application (e.g., client A (130), client B (135), client C (140)) as depicted in FIG. 1, in accordance with various embodiments of the invention.

The social networking website (e.g., social networking website A (110), social networking website B (115), social networking website C (120)) may be any website having a user profile. The social networking website may include geospatial information, personal information, events, and/or messages related to the user. The profile may include public, private, and/or restricted components and may be configured to send and/or receive data from the calendar server (100). Examples of a social networking website may include, but are not limited to, Facebook™ of the Facebook Corporation (including Facebook Places™), Twitter®, Google Latitude™, Foursquare™, LinkedIn®, Loopt®, Evite®, and Whrrl®.

In one or more embodiments of the invention, the social networking website includes a calendar which is updatable by the user and/or any authorized person or entity. The calendar may track events, appointments, meetings, dates (e.g., birthdays, anniversaries, etc.), alerts, messages, and/or information of the user. In one or more embodiments of the invention, the calendar server (100) is configured to synchronize a calendar (e.g., calendar A (102), calendar B (104), calendar C (106), calendar D (108)) of a user with one or more calendars in one or more social networking websites.

The GPS-enabled device (125) may be any device having a GPS receiver. Examples of a GPS-enabled device (125) may include, but are not limited to, a smartphone, a laptop computer, a tablet computer, a PDA, a navigation device, and a netbook computer.

In one or more embodiments of the invention, the calendar server (100) is operatively connected to a financial management application (FMA) (not shown). The FMA may be a web-based application or a client application installed on a computing device of a user. The calendar server (100) may identify, within the FMA, one or more financial transactions involving the user and a merchant or other entity. For example, the calendar server (100) may identify a payment made by the user to a utility company. In one or more embodiments of the invention, the calendar server (100) is configured to identify two or more transactions involving a common payee. The calendar server (100) may then calculate a frequency of payment to the payee based on the two or more transactions. For example, the calendar server (100) may identify a first transaction involving a payment from the user to "Acme Wireless Co." on January 1, and a second payment from the user to "Acme Wireless Co." on February 1. In this example, the calendar server (100) calculates that the frequency of payment to this payee is 1 month.

In one or more embodiments of the invention, the calendar server (100) includes functionality to identify one or more financial transactions based on one or more predefined criterion. Examples of a predefined criterion may include, but are not limited to, transactions made on the same day (e.g., of the month, week, year, etc.), transactions made at the same time of day, transactions with the same amount or with amounts within a (percentage or fixed) range of one another, any predefined number of transactions with a common payee, transactions made with a common type of merchant (e.g., category of goods or services sold), transactions with a common description or one or more common words in the description, transactions corresponding to one or more predefined calendar dates (e.g., tax filing deadlines, holidays, and/or calendar dates imported from a social networking profile of the user, etc.), and/or any other criterion. The calendar server (100) may receive one or more criterion from a user and/or may be pre-configured with one or more criterion. In one or more embodiments of the invention, the calendar server (100) is configured to identify the financial transactions in an online banking or investment application (not shown) based on credentials supplied by the user.

The criterion may involve data obtained from one or more social networking websites and/or external calendars synched with the user's calendar (e.g., calendar A (102), calendar B (104), calendar C (106), calendar D (108)) within the calendar server. For example, the calendar server (100) may extract important dates from a profile and/or calendar of a user on a social networking website. In this example, the calendar server (100) comes with a predefined criterion which matches the extracted dates to one or more historical transactions for goods purchased within 5 days of the extracted dates. Continuing the example, the calendar server (100) matches a marriage anniversary date from a social networking website with a financial transaction in an FMA of the user. The payee of the financial transaction is a local jewelry store. After matching the anniversary date with the financial transaction, the calendar server (100) creates a new event for a future anniversary date in a calendar of the user. In this example, the calendar server (100) the event includes the reminder message "purchase gift for anniversary."

In one or more embodiments of the invention, the calendar server (100) includes functionality to identify geospatial data and/or metadata associated with one or more entries such as images, video files, websites, SMS messages, and/or RSS feeds. The metadata may be data extracted from or identified within one or more social networking websites. Geospatial data may include one or more GPS coordinates and/or any form of geographical identification in accordance with various embodiments of the invention.

In one example, a user uploads two images taken with a GPS-enabled digital camera to a social networking website within a period of two days. The GPS-enabled camera embeds GPS coordinates of the user's physical location into the images. In this example, the calendar server (100) identifies the two images and extracts a timestamp and GPS coordinates from metadata embedded within the images. The calendar server (100) then determines that the GPS coordinates are within a predefined distance of one another and that they correspond to an address of a coffee shop. In this example, the calendar server (100) uses a criterion that defines two or more visits to a coffee shop within a one week period to be a recurring event. Continuing the example, the calendar server (100) determines that the user frequents the coffee shop at a frequency of every two days. The calendar server (100) calculates the frequency as the average of the time difference between the images. Based on the criterion and the frequency, the calendar server (100) creates a new recurring event within a calendar of the user. The date (i.e., calendar date) of the first instance of the new recurring event is calculated as being a summation of the timestamp of the last image and the frequency.

In one or more embodiments of the invention, the calendar server (100) includes functionality to calculate a frequency of an event based on one or more dates. The calendar server may use a mathematical function such as the mean, median, or mode of the differences between two or more identified dates to calculate the frequency. The date may include a time of day and/or may be rounded to the nearest second, minute, hour, day, week, month, and/or year in accordance with various embodiments of the invention. In one or more embodiments of the invention, the calendar server (100) determines a method of calculating the frequency based on data obtained from a social networking website, FMA, and/or other application. The data may include entries referencing one or more locations, businesses residing at a physical location, a type of entity residing at the physical location, a person residing at the physical location, and/or any other relevant data extracted from the website. In one or more embodiments of the invention, the calendar server (100) calculates the frequency based on a single calendar date and one or more predefined criterion and/or relevant calendar information.

In one or more embodiments of the invention, the calendar server (100) includes functionality to match an address of a business, charitable, or other entity to the location. The calendar server (100) may then search one or more contact lists of the user within the calendar server or within one or more social networking websites for a name of the entity. The calendar server (100) may determine that an entry in a contact list matches the name based on a textual match of any portion of the name to the entry. The calendar server (100) may search the social networking website for important dates associated with the business, charitable, or other entity and may identify periodic or recurring dates based on previously attended events, common periodic messages (textually matched, e.g., a dentist appointment), optical character recognition of geotagged images, public events identified based on a search of public events within a range of the location, and/or any predefined criterion for identifying a recurring event. The calendar server (100) may then calculate a frequency of the event and add the recurring event to a calendar of the user.

Examples of a location may include but are not limited to a physical location, a web address, a website, a web page, a chat room, a virtual location, and/or any social construct capable of facilitating communication between two or more people.

In one or more embodiments of the invention, the calendar server (100) may, on the date of the scheduled event, perform a search of the one or more social networking websites and/or FMAs in order to determine whether the user attended the event or visited the location. If the calendar server (100) is unable to identify an entry referencing the event, or any indication that the user attended the event, the calendar server (100) may remove future instances of the recurring event from the user's calendar.

In one or more embodiments of the invention, the calendar server (100) includes functionality to identify and/or schedule an event in the user's calendar based on a single entry identified on a social networking website. For example, the calendar server (100) may use geotagging metadata obtained from an image uploaded to a social networking website to determine that a user attended an annual music festival. In this example, the calendar server (100) matches temporal data (e.g., a timestamp) and a set of GPS coordinates extracted from the image with the date and address of the music festival. In the example, the calendar server (100) then creates a new tentative event in a calendar of the user for next year's celebration of the music festival.

In one or more embodiments of the invention, the calendar server (100) includes functionality to search (periodically or at a predefined time) for information relevant to an identified event. For example, the calendar server (100) may identify a technology conference in a calendar of a user. In this example, the calendar server (100) identifies appointments such as presentations, workshops, and/or meetings during the conference based on one or more criteria/interests of the user and/or a schedule of events of the conference. The calendar server (100) may then add the identified appointments to the user's calendar as tentative events. In another example, the calendar server (100) searches for information relevant to a previously attended event. In this example, the calendar server (100) determines that a user has attended the technology conference in a previous year. Based on this determination, the calendar server (100) then searches for ticket information and adds a notification to the user's calendar to purchase tickets to the conference at a future date (e.g., when the tickets become available for purchase).

In one or more embodiments of the invention, the calendar server (100) includes functionality to match a home address of an individual to the location. The calendar server (100) may then search one or more contact lists of the user within the calendar server or within one or more social networking websites for a name of the individual. The calendar server (100) may determine that an entry in a contact list matches the name based on a textual match of any portion of the name to the entry. The calendar server (100) may then search the social networking website for important dates associated with the entry and may identify periodic or recurring events based on a birth date, common periodic messages (textually matched, e.g., a family reunion), birth date of a child or common relative/friend, facial recognition of one or more images, and/or any predefined criterion for identifying a recurring event. The calendar server (100) may then calculate a frequency for the periodic or recurring event(s) and add the event(s) to a calendar of the user.

In one or more embodiments of the invention, the calendar server (100) is configured to ask the user whether to add an event to the user's calendar. The calendar server (100) may send a message to a computing device of the user (e.g., a smartphone, laptop computer, desktop computer, PDA, tablet computer, etc.) requesting approval to add the event to the calendar. The calendar server (100) may use any means of sending messages, including short message service (SMS) or other text message, email, secure communication session, automated telephone caller, and/or any other means of communicating with the user and/or the computing device. After sending the message, the calendar server (100) may be configured to receive a response from the user indicating an acceptance or rejection of the proposed event. The response sent from the user or computing device may also use any means of sending messages (e.g., SMS message, telephone call, etc.). In one or more embodiments of the invention, the calendar server (100) is configured to schedule the event as a tentative event and to notify the user that the tentative event has been scheduled (e.g., via a message sent to the computing device).

In one or more embodiments of the invention, the calendar server (100) includes functionality to synchronize events between one or more users. The calendar server (100) may receive a request from a first user to synchronize one or more predefined types of events (e.g., entertainment, dining, leisure, business, etc.) with one or more other users. These other users may be connected to the user via a contact list of a social networking website. In response to the request, the calendar server (100) may analyze one or more entries made by the other users in the social networking website and identify periodic events based on one or more locations associated with the entries. The calendar server (100) may then add a new event to a calendar of the first user coinciding with the periodic events. In one or more embodiments of the invention, the calendar server (100) is configured to import events, alerts, holidays, reminders, appointments, and/or other data from one or more calendars of the other users. The calendar server (100) may then create the new event based on the data imported from the calendar(s) of the other user(s).

In one or more embodiments of the invention, the calendar server (100) includes functionality to invite one or more friends or contacts of the user to an event. The calendar server (100) may identify the friends or contacts based on geospatial metadata obtained from a social networking website. For example, the calendar server (100) may identify a friend who attended a previous event with the user based on a geotagged image of the user with the friend. In this example, based on the image, the calendar server (100) creates a new event in a calendar of the user for the same event in the upcoming year. Continuing the example, and also based on the image, the calendar server (100) obtains permission from the user to invite the friend to the event and add the event to a calendar of the friend.

In one or more embodiments of the invention, the calendar server (100) includes functionality to communicate with a mobile application (not shown) installed in a mobile device of a user (e.g., GPS-enabled device (125)). The mobile application may be configured to send GPS coordinates directly to the calendar server (100) and to obtain modifications, messages, and input to the calendar from the user. The mobile application may also notify the user of newly added events and/or receive approval of tentative events from the user. In one or more embodiments of the invention, the mobile application is configured to synchronize the user's calendar with one or more other calendars used by the user. The mobile application may synchronize with a mobile application calendar, a web-based calendar, a business calendar, and/or any other type of calendar, in accordance with various embodiments of the invention.

Figure 2:
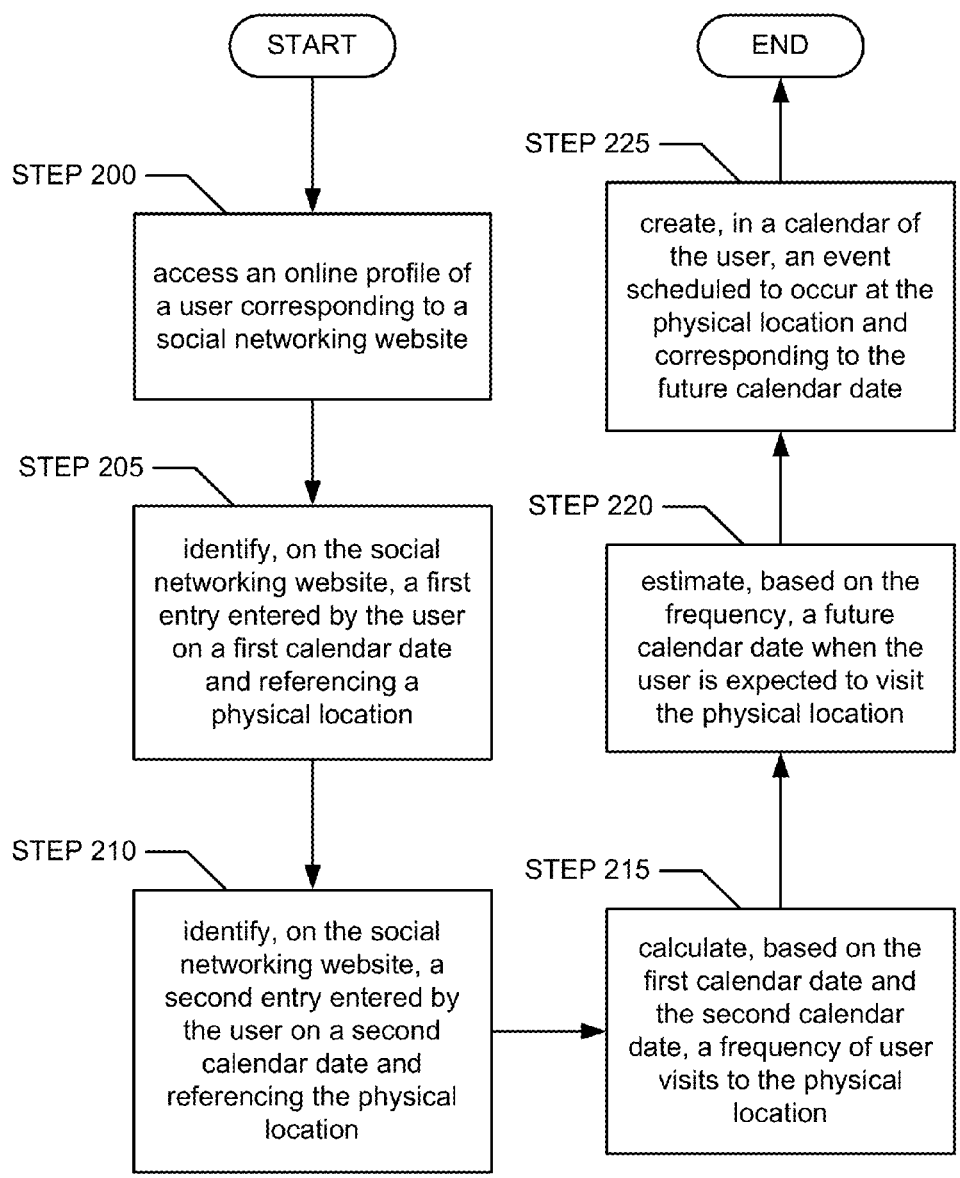
FIG. 2 shows a flowchart in accordance with one or more embodiments of the invention.

FIG. 2 shows a flowchart of a method for creating an event in a calendar based on entries to a social networking website. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in different order. Accordingly, the specific arrangement of steps shown in FIG. 2 should not be construed as limiting the scope of the invention.

In STEP 200, in one or more embodiments of the invention, an online profile of a user corresponding to a social networking website is accessed. The online profile may be accessed using credentials obtained from the user via a calendar server (e.g., calendar server (100) of FIG. 1, discussed above) configured to scrape calendar information from the social networking website. The online profile may be public, private, and/or restricted according to one or more security mechanisms of the social networking website. In the case of a public profile, security credentials may not be required for access.

In STEP 205, in one or more embodiments of the invention, a first entry entered by a user on a first calendar date and referencing a physical location, is identified on the social networking website. The entry may include a text string, geospatial metadata or data, a multimedia file, and/or any means of identifying a location. In one or more embodiments of the invention, the social networking website is scraped and/or accessed and searched in order to identify the first entry. Alternatively, in one or more embodiments of the invention, the social networking website pushes the entry to an external software application such as a calendar server (e.g., calendar server (100) of FIG. 1, discussed above).

In STEP 210, in one or more embodiments of the invention, a second entry entered by the user on a second calendar date and referencing the location, is identified on the social networking website. The first entry and the second entry are identified simultaneously or in any order and by any means of identifying information on a website or application, in accordance with various embodiments of the invention.

In STEP 215, in one or more embodiments of the invention, a frequency of user visits to the physical location is calculated based on the first calendar date and the second calendar date. The frequency may be calculated based on a mathematical function of the first calendar date and the second calendar date and/or may be affected by one or more predefined criterion. The frequency may further be calculated based upon calendar information extracted from the social networking website. In one example, a federal holiday is identified based on the first entry, and thus, the calendar server determines that the event is annual (i.e., frequency is one year).

In STEP 220, in one or more embodiments of the invention, a future calendar date when the user is expected to visit the physical location is calculated based on the frequency. The future calendar date may be calculated by adding the frequency to the last visited calendar date of the location and/or may involve any number of criteria. In one or more embodiments of the invention, calculation of the future calendar date involves calendar information obtained from an FMA and based upon one or more financial transactions. In one or more embodiments of the invention, the future calendar date is postponed based on one or more existing events in a calendar of the user. For example, the future calendar date may be postponed until a weekday or until after a planned vacation.

In STEP 225, in one or more embodiments of the invention, an event scheduled to occur at the physical location and corresponding to the future calendar date is created in a calendar of the user. The event may be recurring, singular, tentative, confirmed, and/or unconfirmed. In one or more embodiments of the invention, relevant calendar information such as one or more media files, text messages, status updates, alerts, descriptions, and/or requests extracted from the social networking website is included in the event. One or more friends and/or contacts of the user may also be invited to the event, in accordance with various embodiments of the invention.

Figure 3:
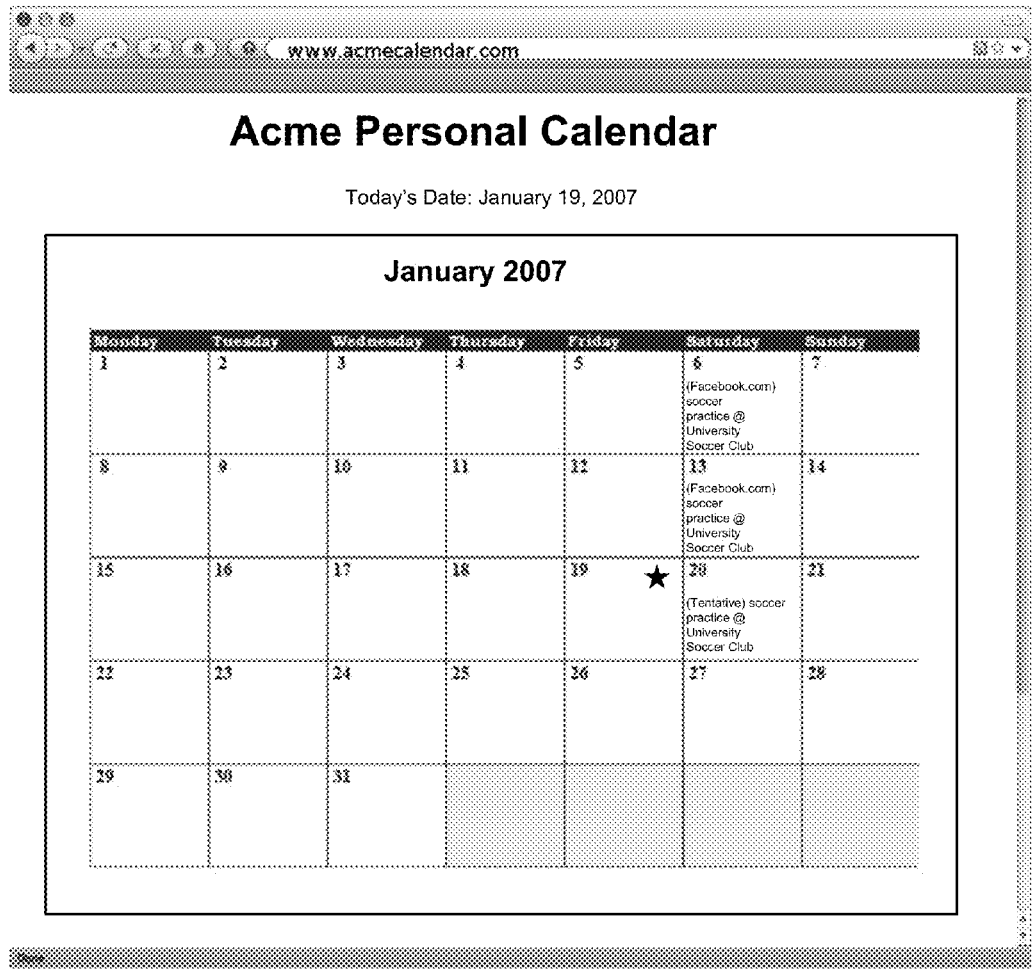
FIG. 3 shows a screenshot of a calendar server in accordance with one or more embodiments of the invention.

FIG. 3 depicts an example screenshot of a calendar server (e.g., calendar server (100) of FIG. 1, discussed above) in accordance with one or more embodiments of the invention. In this example, a user creates a calendar within the calendar server. During the month of January 2007, the user decides to enroll in the University Soccer Club. After enrolling, the user begins to attend weekly soccer practices on Saturday afternoons at 1:00 PM. The user takes a GPS-enabled smartphone to the first soccer practice on January $6^{th}$. Upon arriving at the University Soccer Club, the user creates a first entry in a social networking website. The entry includes the message "soccer practice" and metadata containing GPS coordinates of the user's location. Upon detecting the entry and while scraping the social networking website for calendar material, the calendar server searches for periodic events using a set of predefined criterion. In this example, after detecting the first entry, the calendar server fails to identify a periodic event.

Continuing the example, on January $13^{th}$, the user attends a second soccer practice at the same location. During this practice, the user, using the smartphone, takes a photograph of a friend and uploads the photograph to the social networking website. The user's friend is listed as a contact within the social networking website. Thus, the user proceeds to tag the friend within the image, such that the social networking website creates a label identifying the friend when displaying the image. After the photograph has been uploaded, the calendar server again scrapes the social networking website and identifies the photograph. The calendar server downloads the photograph and extracts a set of GPS coordinates identifying the location of the user at the time the photograph was taken. The calendar server matches the location of the second soccer practice to the location of the first soccer practice (based on the first entry). The calendar server also matches an address of University Soccer Club to the two locations by querying a map application. The calendar server determines, based on a predefined criteria that because the two locations and the business address are all within a 50 foot proximity, a match has been made. Upon making the match, the calendar server creates a recurring event in the user's calendar corresponding to the weekly soccer practice. As shown in FIG. 3, the future date of the event is labeled as tentative, while the previous dates (January $6^{th}$ and $13^{th}$) are included with an indication of the social networking website (Facebook.com). The calendar server labels the recurring event as "soccer practice" based on the first entry. In this example, the calendar server makes only one future instance of the event (i.e., January $20^{th}$) in the user's calendar. If the user attends practice on this day, the calendar server will continue creating future instances. If not, the calendar server removes the event from the user's calendar.

Continuing the example, the calendar server sends a message, based on the photograph uploaded to the social networking website, to the user's smartphone requesting permission to notify the user's friend of the recurring event. The calendar server identifies the user's friend in the user's contact list and, upon receiving approval from the user, sends a message to the friend via the social networking service requesting permission to add the recurring event to a calendar of the user. In this example, the calendar server is communicatively connected to an application executing on the platform of the social networking service. The application is an extension of the calendar server, allowing users of the social networking website to maintain calendars on the calendar server via the social networking website. The user's friend accepts the request and installs the application in order to maintain a calendar with the added recurring event.

In another example, a business owner purchases seasonal items for the Halloween holiday from two separate suppliers. In order to sell the seasonal items in a retail store during the month of October, the business owner typically purchases the items from the suppliers in early September. In this example, the business owner creates a calendar using a calendar server (e.g., calendar server (100) of FIG. 1, discussed above) and provides credentials for an online FMA to the calendar server. The calendar server connects to the FMA using the credentials and proceeds to scan the business owner's purchase history using a set of predefined criteria. One criterion of the set of criteria identifies transactions matching a predefined type of payee (i.e., selling seasonal Halloween items). While scanning the purchase history, the calendar server identifies two such transactions in the current year. Both are debits made for purchases from the two suppliers. The calendar server matches the payees of the transactions to suppliers in a list of payees for the predefined type. Upon identifying the suppliers in the list, the calendar server calculates a frequency value of one year based on the criterion and the timing of the two financial transactions. The calendar server then creates a new event in a calendar of the business owner for the next year. The new event is dated based on an average of the two transaction dates and includes an alert reminding the business owner to purchase Halloween items in time for the holiday.

Figure 4:
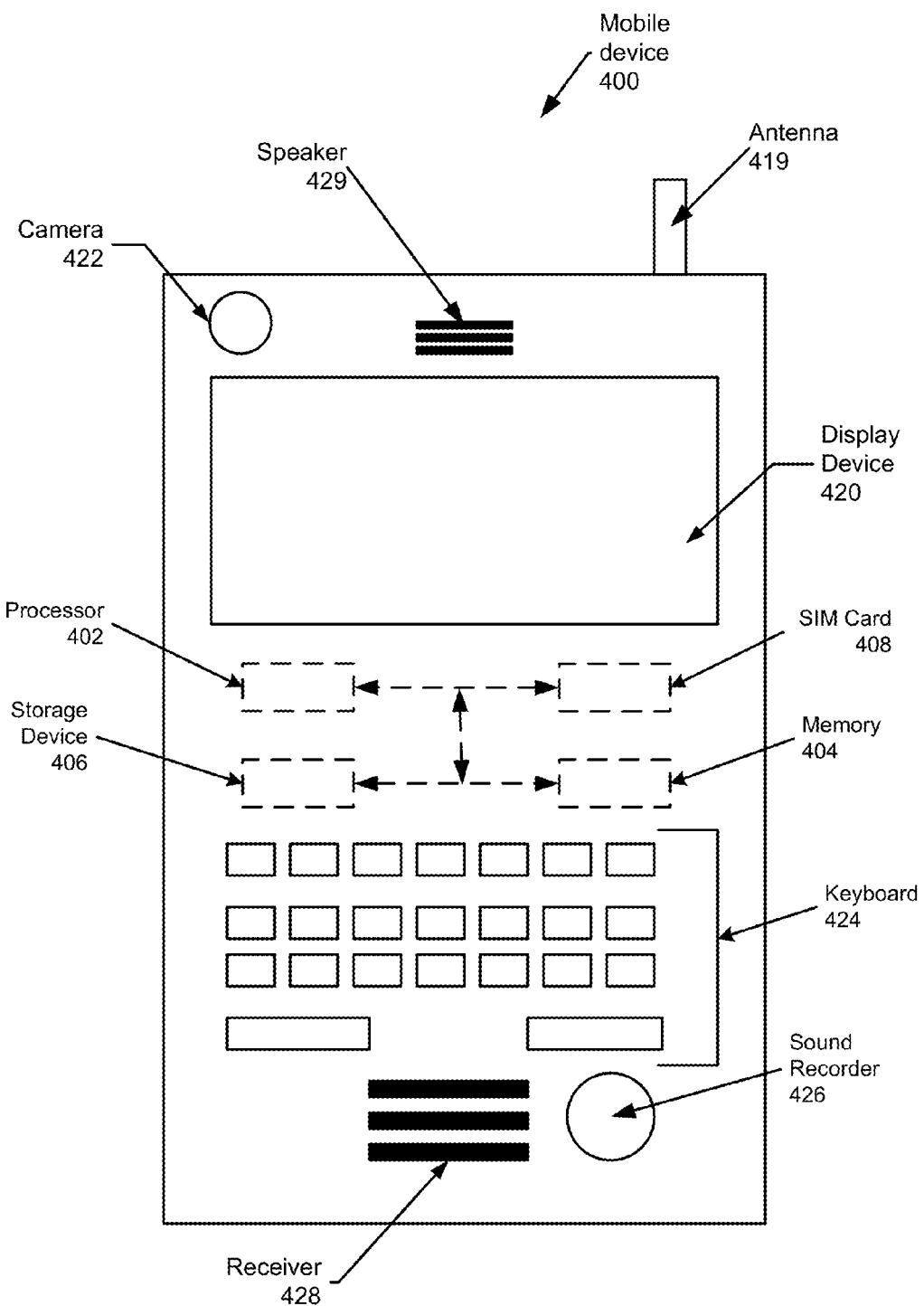
FIG. 4 shows a mobile device in accordance with one or more embodiments of the invention.

Embodiments of the invention may be implemented on virtually any type of mobile device regardless of the platform being used. In one or more embodiments of the invention, the mobile device (400) includes any portable device that provides a user interface. Examples of mobile devices may include, but are not limited to, cellular phones, personal digital assistants, personal communicators, pagers, smart phones, or any other computing device. For example, as shown in FIG. 4, a mobile device (400) includes a processor (402), memory (404), a storage device (406), a subscriber identification module (SIM) card (408), a speaker (429), a receiver (428), a keyboard (424), a sound recorder (426), a display device (420), a camera (422), and an antenna (419).

The mobile device (400) includes one or more processor(s) (402), associated memory (404) (e.g., RAM, cache memory, flash memory, etc.), a storage device (406) (e.g., a hard disk, an optical drive such as a compact disk drive or digital video disk (DVD) drive, a flash memory stick, etc.), a SIM card (408), and numerous other elements and functionalities typical of today's mobile devices (not shown). The mobile device (400) may include input means and output means, such as the keyboard (424), the receiver (428), and/or the display device (e.g., a liquid crystal display screen) (420), which permits a user to enter and/or display keystrokes including numeric, alphabetic, and other characters, images, or other media types. Other input devices may include a camera (422), a sound recorder (426), and/or other data recording mechanism. Those skilled in the art will appreciate that these input and output means may take other forms now known or later developed. Using embodiments of the present invention, a consumer may initiate an electronic funds transfer using the mobile device (400).

The mobile device (400) may be connected to a network (e.g., a local area network (LAN), a wide area network (WAN) such as the Internet, or any other similar type of network) via the antenna (419) or other network interface connection(s) (not shown). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (400) with a mobile device identifier of the mobile device (400).

In one or more embodiments of the invention, the network connection may be facilitated by a hardwired or other similar connection. For example, the network connection may involve a hardwire connection or short-range wireless connectivity technology with a second mobile device, a printing mechanism, a scanner, or a recording system.

Figure 5:
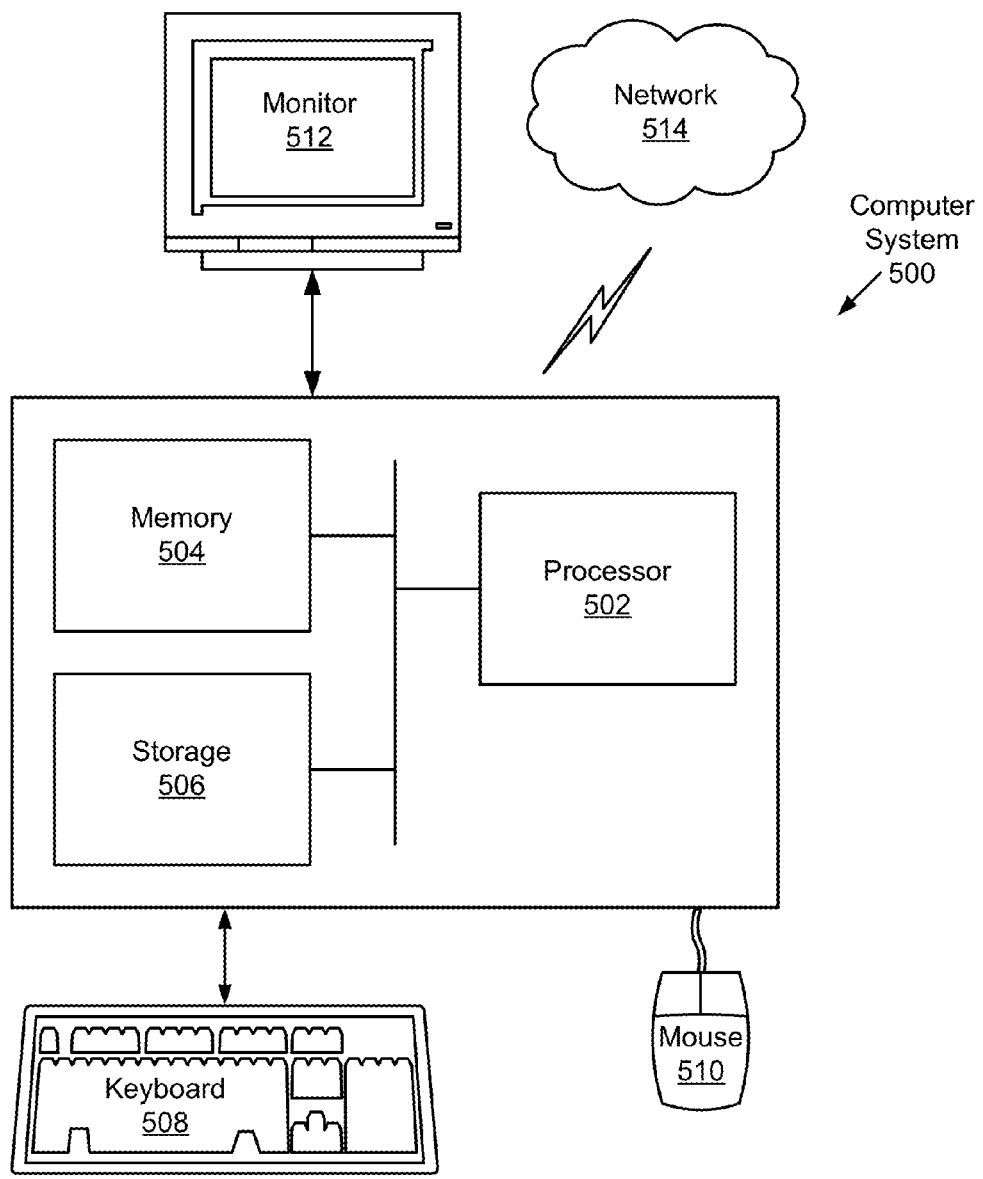
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502) (such as a central processing unit (CPU), integrated circuit, hardware processor, etc.), associated memory (504) (e.g., RAM, cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention (e.g., calendar server (100), calendar A (102), calendar B (104), calendar C (106), calendar D (108), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

One or more embodiments of the invention have one or more of the following advantages. By estimating a future date of an event based on data obtained from a social networking website, a user's calendar may be maintained and updated automatically. Manual data entry and input time may be decreased and users may be notified of relevant and important events of which they are unaware. In this way, users may be reminded of upcoming events, deadlines, and/or important dates.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for maintaining a calendar of a user, comprising:

accessing an online profile of the user at a first social networking website;

identifying, on the online profile, a first post referencing a physical location,
  wherein the first post is created on the first social networking website by a client application of the user on a first calendar date, and
  wherein the first post comprises a timestamp of the first calendar date;
identifying, on the online profile, a second post referencing the physical location,
  wherein the second post is created on the first social networking website by the client application of the user on a second calendar date, and
  wherein the second post comprises a timestamp of the second calendar date;
calculating, by a computer processor and based on the timestamp of first calendar date and the timestamp of second calendar date, a first time period between user visits to the physical location;
estimating, based on the first time period between user visits, a future calendar date when the user is expected to visit the physical location;
creating, in the calendar, an event scheduled to occur at the physical location and on the future calendar date;
determining, after the future calendar date and based on the first social networking website and a second social networking website, that the user did not visit the physical location on the future calendar date;
identifying, on the first social networking website, a third post referencing the physical location, wherein the third post is entered by the user on a third calendar date, wherein the third post comprises a timestamp of the third calendar date, and wherein the third calendar date is after the future calendar date;
calculating a modified first time period between user visits based on the third calendar date;
estimating, based on the modified first time period between user visits, a new future calendar date when the user is expected to visit the physical location; and
creating, in the calendar, a new event corresponding to the new future calendar date.

2. The method of claim 1, wherein the first post and the second post comprise a first global positioning system (GPS) coordinate of the physical location.

3. The method of claim 2, further comprising:
identifying, based on the first GPS coordinate, a business residing at the physical location of the event, wherein the physical location is an address of the business; and
entering a name of the business into the calendar for the event.

4. The method of claim 1, further comprising:
downloading the calendar into a client application installed on a mobile device of the user.

5. The method of claim 1, wherein identifying the first post comprises:
identifying, on the first social networking website, an image uploaded by the user; and
extracting, from the image, a plurality of geospatial metadata comprising a global positioning system (GPS) coordinate of the physical location.

6. The method of claim 1, further comprising:
identifying, within a financial management application of the user, a plurality of financial transactions between the user and a merchant;
calculating, based on the plurality of financial transactions, a frequency of transactions between the user and the merchant;
estimating, based on the frequency, an execution date of a future financial transaction between the user and the merchant; and
creating, in the calendar, a notification of the future financial transaction corresponding to the execution date.

7. The method of claim 1, further comprising:
identifying, on the first social networking website, a message corresponding to the first post; and
entering the message into the calendar for the event.

8. The method of claim 1, further comprising:
creating, in the calendar, an indication that the event is tentative.

9. A non-transitory computer-readable storage medium storing a plurality of instructions for maintaining a calendar of a user, the plurality of instructions comprising functionality to:
access an online profile of the user at a first social networking website;
identify, on the online profile, a first post referencing a physical location,
  wherein the first post is created on the first social networking website by a client application of the user on a first calendar date, and
  wherein the first post comprises a timestamp of the first calendar data;
identify, on the online profile, a second post referencing the physical location,
  wherein the second post is created on the first social networking website by a client application of the user on a second calendar date, and
  wherein the second post comprises a timestamp of the second calendar date;
calculate, and based on the timestamp of first calendar date and the timestamp of second calendar date, a first time period between user visits to the physical location;
estimate, based on the first time period between user visits, a future calendar date when the user is expected to visit the physical location;
create, in the calendar, an event scheduled to occur at the physical location and on the future calendar date;
determine, after the future calendar date and based on the first social networking website and a second social networking website, that the user did not visit the physical location on the future calendar date;
identify, on the first social networking website, a third post referencing the physical location, wherein the third post is entered by the user on a third calendar date, wherein the third post comprises a timestamp of the third calendar date, and wherein the third calendar date is after the future calendar date;
calculate a modified first time period between user visits based on the third calendar date;
estimate, based on the modified first time period between user visits, a new future calendar date when the user is expected to visit the physical location; and
create, in the calendar, a new event corresponding to the new future calendar date.

10. The non-transitory computer-readable storage medium of claim 9, wherein the first post and the second post comprise a global positioning system (GPS) coordinate of the physical location.

11. The non-transitory computer-readable storage medium of claim 10, wherein the plurality of instructions further comprise functionality to:

identify, based on the GPS coordinate, a business residing at the physical location of the event, wherein the physical location is an address of the business; and enter a name of the business into the calendar for the event.

12. The non-transitory computer-readable storage medium of claim 9, wherein identifying the first post comprises:

identifying, on the first social networking website, an image uploaded by the user; and extracting, from the image, a plurality of geospatial metadata comprising a global positioning system (GPS) coordinate of the physical location.

13. The non-transitory computer-readable storage medium of claim 9, wherein the plurality of instructions further comprise functionality to:

identify, within a financial management application of the user, a plurality of financial transactions between the user and a merchant;

calculate, based on the plurality of financial transactions, a second period of time between transactions between the user and the merchant;

estimate, based on the second period of time between transactions, an execution date of a future financial transaction between the user and the merchant; and create, in the calendar, a notification of the future financial transaction corresponding to the execution date.

14. The non-transitory computer-readable storage medium of claim 9, wherein the plurality of instructions further comprise functionality to:

identify, on the first social networking website, a message corresponding to the first post; and enter the message into the calendar for the event.

15. A system for maintaining a calendar of a user, comprising:

a processor;

a calendar server executing on the processor and configured to:

access an online profile of the user at a first social networking website;

identify, on the online profile, a first post referencing a physical location, wherein the first post is created on the first social networking website by a client application of the user on a first calendar date, and wherein the first post comprises a timestamp of the first calendar data;

identify, on the online profile, a second post referencing the physical location, wherein the second post is created on the first social networking website by a client application of the user on a second calendar date and wherein the second post comprises a timestamp of the second calendar date;

calculate, and based on the timestamp of first calendar date and the timestamp of second calendar date, a first time period between user visits to the physical location;

estimate, based on the first time period between user visits, a future calendar date when the user is expected to visit the physical location;

create, in the calendar, an event scheduled to occur at the physical location and on the future calendar date;

determine, after the future calendar date and based on the first social networking website and a second social networking website, that the user did not visit the physical location on the future calendar date;

identify, on the first social networking website, a third post referencing the physical location, wherein the third post is entered by the user on a third calendar date, wherein the third post comprises a timestamp of the third calendar date, and wherein the third calendar date is after the future calendar date;

calculate a modified first time period between user visits based on the third calendar date;

estimate, based on the modified first time period between user visits, a new future calendar date when the user is expected to visit the physical location; and create, in the calendar, a new event corresponding to the new future calendar date.

16. The system of claim 15, wherein the first post and the second post comprise a global positioning system (GPS) coordinate of the physical location.

17. The system of claim 16, further comprising:

a mobile device comprising a GPS receiver and configured to:

transmit, on the first calendar date, the GPS coordinate to the first social networking website in order to perform the first post; and transmit, on the second calendar date, the GPS coordinate to the first social networking website in order to perform the second post.

18. The system of claim 15, wherein the calendar server further comprises functionality to:

identify, within a financial management application of the user, a plurality of financial transactions between the user and a merchant;

calculate, based on the plurality of financial transactions, a second period of time between transactions between the user and the merchant;

estimate, based on the second period of time between transactions, an execution date of a future financial transaction between the user and the merchant; and create, in the calendar, a notification of the future financial transaction corresponding to the execution date.

19. The system of claim 15, wherein identifying the first post comprises:

identifying, on the first social networking website, an image uploaded by the user; and extracting, from the image, a plurality of geospatial metadata comprising a global positioning system (GPS) coordinate of the physical location.

* * * * *